United States Patent
Nagae

(10) Patent No.: US 11,932,272 B2
(45) Date of Patent: Mar. 19, 2024

(54) VEHICLE ABNORMALITY HANDLING SUPPORT DEVICE

(71) Applicant: TOYOTA JIDOSHA KABUSHIKI KAISHA, Toyota (JP)

(72) Inventor: Hajime Nagae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/952,834

(22) Filed: Sep. 26, 2022

(65) Prior Publication Data

US 2023/0131653 A1 Apr. 27, 2023

(30) Foreign Application Priority Data

Oct. 21, 2021 (JP) ................................. 2021-172327

(51) Int. Cl.
| | |
|---|---|
| *B60W 50/14* | (2020.01) |
| *B60K 35/00* | (2006.01) |
| *B60W 40/08* | (2012.01) |
| *B60W 50/00* | (2006.01) |

(52) U.S. Cl.
CPC ............. *B60W 50/14* (2013.01); *B60K 35/00* (2013.01); *B60W 40/08* (2013.01); *B60W 50/0098* (2013.01); *B60K 2370/161* (2019.05); *B60W 2040/0818* (2013.01); *B60W 2050/146* (2013.01); *B60W 2540/221* (2020.02)

(58) Field of Classification Search
None
See application file for complete search history.

(56) References Cited

U.S. PATENT DOCUMENTS

| | | | |
|---|---|---|---|
| 2005/0270145 | A1 | 12/2005 | Kataoka et al. |
| 2013/0162794 | A1 | 6/2013 | Wakayama |
| 2021/0197832 | A1* | 7/2021 | Matsunami ............ B60K 28/06 |

FOREIGN PATENT DOCUMENTS

| | | | |
|---|---|---|---|
| JP | 2000-182192 | A | 6/2000 |
| JP | 2004-242945 | A | 9/2004 |
| JP | 2008-195402 | A | 8/2008 |
| JP | 2009-012705 | A | 1/2009 |
| JP | 2009-190464 | A | 8/2009 |
| JP | 4349210 | A | 10/2009 |
| JP | 4349210 | B2 | 10/2009 |
| JP | 2010-006279 | A | 1/2010 |
| JP | 2013-152700 | A | 8/2013 |
| JP | 2014-024368 | A | 2/2014 |

OTHER PUBLICATIONS

Basic Design Document for Driver Abnormality Handling System (Deceleration Stop Type) (Mar. 2016, Advanced Safety Vehicle Promotion Study Group, Automobile Bureau, Ministry of Land, Infrastructure, Transport and Tourism).

* cited by examiner

*Primary Examiner* — Thomas S McCormack
(74) *Attorney, Agent, or Firm* — Sughrue Mion, PLLC

(57) ABSTRACT

An abnormality handling support device includes: a touch panel display that is able to display an image; and a driving support ECU configured to determine whether a display condition including that an abnormal condition indicating that a driver has difficulty driving a vehicle while the vehicle is traveling is satisfied is satisfied, and to cause the touch panel display to display a support image that is registered beforehand when the driving support ECU determines that the display condition is satisfied.

4 Claims, 4 Drawing Sheets

DRIVER INFORMATION

- EMERGENCY CONTACT : 090-*-**
- CHRONIC CONDITION : YYY DISEASE
- MEDICINE THAT CANNOT BE USED : XXXX

LENS OF THIS CAMERA IS DIRTY
PLEASE WASH

VEHICLE ABNORMALITY HANDLING SUPPORT DEVICE

CROSS-REFERENCE TO RELATED APPLICATION

This application claims priority to Japanese Patent Application No. 2021-172327 filed on Oct. 21, 2021, incorporated herein by reference in its entirety.

BACKGROUND

1. Technical Field

The present disclosure relates to a vehicle abnormality handling support device.

2. Description of Related Art

Conventionally, a driver abnormality handling system as described in a basic design document for a driver abnormality handling system (deceleration stop type) by the Advanced Safety Vehicle Promotion Study Group of the Ministry of Land, Infrastructure, Transport and Tourism is known. The driver abnormality handling system as disclosed in the basic design document for a driver abnormality handling system (deceleration stop type) by the Advanced Safety Vehicle Promotion Study Group of the Ministry of Land, Infrastructure, Transport and Tourism is a system that stops a vehicle on behalf of a driver as an emergency measure when safe driving suddenly cannot be continued while the driver is driving the vehicle due to a sudden change in the driver's physical condition, etc. Japanese Unexamined Patent Application Publication No. 2014-24368 (JP 2014-24368 A) discloses an emergency evacuation support device for a vehicle provided with a system such as the system above. The emergency evacuation support device described in JP 2014-24368 A is configured to lock the door when the vehicle makes an emergency stop and then release the door lock when a person present around the vehicle is detected. According to the emergency evacuation support device described in JP 2014-24368 A, after the vehicle has stopped in an emergency, the person present in the vicinity of the vehicle can open the door of the vehicle to perform rescue work for the driver. However, the person in the vicinity of the vehicle may not be able to rescue the driver if they do not know the appropriate rescue method.

SUMMARY

The present disclosure has been made to address the above-mentioned issues. That is, one of the objects of the present disclosure is to provide an abnormality handling device of a vehicle that can inform an occupant and/or a person other than the occupant of the vehicle of an appropriate handling method for an abnormality that has occurred, when an abnormality of the driver of the vehicle has occurred.

In order to achieve the above object, a vehicle abnormality handling support device (11) according to the present disclosure includes: a presentation device (36) configured to be able to present information; and a control device (21) configured to determine whether a presentation condition is satisfied, in which the presentation condition includes that an abnormal condition indicating that an abnormality has occurred for a driver of a vehicle (10) while the vehicle (10) is traveling is satisfied, and to present on the presentation device (36), information on a handling method for the abnormality that is stored beforehand, when the control device determines that the presentation condition is satisfied.

According to the present disclosure, when the presentation condition is satisfied, in which the presentation condition includes that the abnormality condition indicating that the predetermined abnormality has occurred to the driver of the vehicle is satisfied, the control device causes the presentation device to present the information on the handling method for the predetermined abnormality. Thus, the occupant of the vehicle and/or the person other than the occupant can take appropriate measures (for example, rescue activities) against the abnormality of the driver based on the information presented on the presentation device regarding how to handle the abnormality.

In one aspect of the present disclosure, the control device (21) may be configured to execute automatic stop control that automatically stops the vehicle (10) when the control device (21) determines that the abnormal condition is satisfied while the vehicle (10) is traveling, and to determine that the presentation condition is satisfied when the vehicle (10) is stopped by the automatic stop control.

According to such a configuration, after the vehicle has stopped, a passenger and the like of the vehicle can know the appropriate handling method for the abnormality that has occurred. Thus, it is possible to enhance the effect of preventing or suppressing the passenger of the vehicle from moving in the vehicle or moving the body of the driver so as to perform measures for the abnormality of the driver before the vehicle is stopped and thus, it is possible to increase the effect of ensuring the safety of the passenger.

In one aspect of the present disclosure, the presentation device (36) may be a display device (361) that displays an image, and the control device (21) may be configured to cause the display device (361) to display a first image (61) that is an image related to a handling method of the abnormality stored beforehand and that is associated with the abnormality, when the control device (21) determines that the presentation condition is satisfied.

According to such a configuration, the passenger or the like of the vehicle can visually grasp, with the first image displayed on the display device, the appropriate handling method for the abnormality that has occurred. Thus, more appropriate measures (for example, rescue activities) can be taken for the abnormality of the driver. The first image may be a video or a still image. When the first image is a video, the display device replays the video serving as the first image when the presentation condition is satisfied. When the first image is a video, it is possible to inform the passenger and the like of the vehicle (a rescuer, and the like) in an easy-to-understand manner how to appropriately handle the abnormality that has occurred.

In one aspect of the present disclosure, from a time when the control device (21) determines that the abnormal condition is satisfied while the vehicle (10) is traveling until the vehicle (10) is stopped, the control device (21) may be configured to cause the display device (361) to display a second image that informs an occupant that the first image is displayed on the display device (361) after the vehicle (10) is stopped.

According to such a configuration, the passenger of the vehicle can recognize that "the passenger can know the appropriate handling method for the abnormality that has occurred, after the vehicle has stopped." Thus, it is possible to enhance the effect of preventing or suppressing the passenger of the vehicle from moving in the vehicle or moving the body of the driver so as to perform measures for the abnormality of the driver before the vehicle is stopped.

In one aspect of the present disclosure, a plurality of images including a video that indicates how to use an automatic extracorporeal defibrillator, a video showing a procedure of cardiopulmonary resuscitation, and an image indicating information regarding the driver may be stored beforehand in the control device (21) as an image regarding a handling method of the abnormality, and the control device (21) may be configured to cause the display device to display, as the first image, one or a plurality of images that is set beforehand to be displayed when the control device (21) determines that the presentation condition is satisfied, among the plurality of images stored beforehand, when the control device determines that the presentation condition is satisfied.

With such a configuration, when the abnormality occurs regarding the driver, the occupant of the vehicle and/or the person present in the vicinity of the vehicle can be notified of the appropriate treatment method for the abnormality of the driver.

In the above description, in order to help understanding of the present disclosure, the names and/or the reference signs used in the embodiment are added in parentheses to the configurations of the disclosure corresponding to the embodiment to be described later. However, respective components of the present disclosure are not limited to the embodiment defined by the above names and/or reference signs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the following description, a vehicle abnormality handling support device may be abbreviated as a "support device". The support device is configured to meet the technical requirements described in the Basic Design Document for Driver Abnormality Handling System (Deceleration Stop Type) (March 2016, Advanced Safety Vehicle Promotion Study Group, Automobile Bureau, Ministry of Land, Infrastructure, Transport and Tourism). In other words, the support device includes this driver abnormality handling system. Hereinafter, this driver abnormality handling system may be referred to as an "EDSS". EDSS is an abbreviation for Emergency Driving Stop System.

Device Configuration

Figure 1:
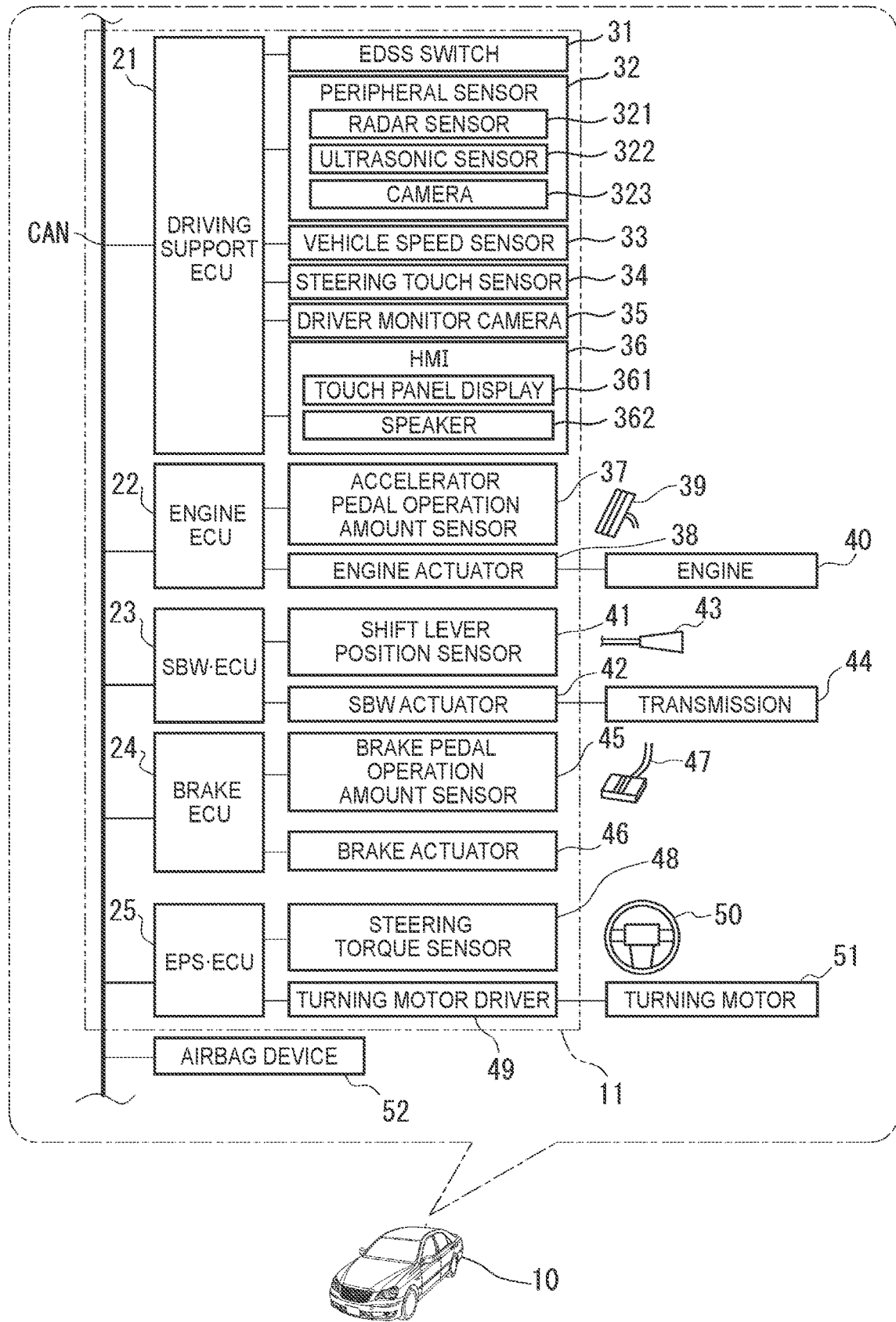
FIG. 1 is a diagram showing a configuration of a vehicle abnormality handling support device.

FIG. 1 is a diagram showing a configuration example of a support device 11 mounted on a vehicle 10. The support device 11 includes a driving support ECU 21, an engine ECU 22, an SBW/ECU 23, a brake ECU 24, and an EPS/ECU 25. In addition, an "ECU" means an electronic control unit. These ECUs include a microcomputer. The microcomputer includes a central processing unit (CPU), a read-only memory (ROM), a random access memory (RAM), a non-volatile memory that is readable and writable, an interface, and the like. In particular, the interface of the driving support ECU 21 is configured to be connectable to a storage device (USB memory device, HDD, SSD, etc.) or an external computer of the vehicle 10. Further, the driving support ECU 21 may be configured to be capable of transmitting and receiving data to and from an external computer by wireless communication. The CPU realizes various functions by executing instructions (programs, routines) stored in the ROM or the non-volatile memory that is readable and writable. These ECUs are connected to each other so that data that is exchangeable (communicable) via controller area network (CAN). Thus, the detection result by the sensor connected to one ECU and the operation for the switch or the like can be acquired by another ECU.

The driving support ECU 21 is a central control device that performs abnormality handling support control described later. The driving support ECU 21 is an example of a control device of the present disclosure. An EDSS switch 31, a peripheral sensor 32, a vehicle speed sensor 33, a steering touch sensor 34, a driver monitor camera 35, and an HMI 36 are connected to the driving support ECU 21.

The EDSS switch 31 is a switch operated by the occupant to instruct the driving support ECU 21 to execute the EDSS control. The "EDSS control" is "a control that determines whether a condition indicating that the driver cannot continue safe driving is satisfied, and that causes the vehicle 10 to automatically stop on behalf of the driver when it is determined that this condition is satisfied." The EDSS switch 31 is arranged at a position where the driver (an occupant seated in a driver's seat) can operate the EDSS switch 31. For example, a push button switch is applied to the EDSS switch 31. The driving support ECU 21 is configured to be able to detect whether the EDSS switch 31 has been operated. It should be noted that the configuration may be such that switching between execution and stopping of the EDSS control can be switched by a touch operation on a touch panel display 361 of the HMI 36 described later.

The peripheral sensor 32 is configured to acquire vehicle peripheral information. The vehicle peripheral information includes information about a three-dimensional object existing in a peripheral region of the vehicle 10 (within a predetermined distance range from the position of the vehicle 10) and information about a lane marking on a road surface around the vehicle 10. The three-dimensional object represents, for example, a moving object such as an automobile, a pedestrian, and a bicycle, and a stationary object such as a guardrail and a fence. The peripheral sensor 32 includes a plurality of radar sensors 321, a plurality of ultrasonic sensors 322, and a plurality of cameras 323. In FIG. 1, for simplification, the radar sensors 321 and the ultrasonic sensors 322 and the cameras 323 are shown one each.

Each radar sensor 321 includes a radar transmission and reception unit and a signal processing unit (not shown). The radar transmission and reception unit radiates radio waves in a millimeter wave band (hereinafter referred to as a "millimeter wave") to the surrounding region of the vehicle 10, and receives the millimeter wave (that is, the reflected wave)

reflected by a three-dimensional object existing in the surrounding region of the vehicle 10. The signal processing unit acquires information indicating a distance between the vehicle 10 and the three-dimensional object, a relative speed between the vehicle 10 and the three-dimensional object, a relative position (direction) of the three-dimensional object with respect to the vehicle 10, and the like based on a phase difference between the transmitted millimeter wave and the received reflected wave, an attenuation level of the reflected wave, the time from the transmission of the millimeter wave to the reception of the reflected wave, and the like. Then, each radar sensor 321 outputs the acquired information to the driving support ECU 21.

Each ultrasonic sensor 322 transmits ultrasonic waves in a pulse shape to the surrounding region of the vehicle 10, and receives the reflected wave reflected by the three-dimensional object. Each ultrasonic sensor 322 acquires information indicating "a reflection point that is a point on the three-dimensional object by which the transmitted ultrasonic waves are reflected", "a distance between each ultrasonic sensor 322 and the three-dimensional object", and the like based on the time it takes from the transmission of the ultrasonic waves to the reception of the reflected waves. Each ultrasonic sensor 322 outputs the acquired information to the driving support ECU 21.

Each camera 323 is, for example, a digital camera having a built-in image sensor of a charge coupled device (CCD) or a CMOS image sensor (CIS). Each camera 323 generates image data of the surrounding region of the vehicle 10 at a predetermined frame rate, and outputs the generated image data to the driving support ECU 21. The cameras 323 include a front camera that captures the region in front of the vehicle 10, a rear camera that captures the region behind the vehicle 10, a right side camera that captures the region on the right side of the vehicle 10, and a left side camera that captures the region on the left side of the vehicle 10.

The vehicle speed sensor 33 detects the speed (vehicle speed) of the vehicle 10 and outputs a signal indicating the vehicle speed to the driving support ECU 21.

The steering touch sensor 34 is a sensor for detecting whether the driver is holding a steering wheel 50. The steering touch sensor 34 is a sensor that can detect that an object has come into contact with the steering wheel 50, and is provided on a portion of the steering wheel 50 that is held by the driver. The driving support ECU 21 acquires the detection result by the steering touch sensor 34, and determines whether the driver is holding the steering wheel 50 based on the acquired detection result.

The driver monitor camera 35 is arranged inside the vehicle and is configured to capture the driver's face. The driving support ECU 21 acquires an image of the driver's face taken by the driver monitor camera 35, and performs predetermined image processing on the acquired image to calculate the driver's face orientation and the driver's line of sight.

The human machine interface (HMI) 36 is arranged in a place where the driver of the vehicle 10 can see and operate the HMI 36. The HMI 36 includes the touch panel display 361 and a speaker 362. The touch panel display 361 is configured to be able to display an image and accept a touch operation, and the like. The HMI 36 is an example of the presentation device and the display device of the present disclosure. When the information to be presented is an image (still image, video), it can be said that the touch panel display 361 included in the HMI 36 is an example of the presentation device and the display device of the present disclosure. The driving support ECU 21 can display various images on the touch panel display 361 of the HMI 36, detect an operation (for example, a touch operation) on the touch panel display 361, and cause the speaker 362 to generate sound. It can also be said that the HMI 36 is a presentation device capable of presenting various information to the occupant of the vehicle 10 and/or a person outside the vehicle by at least one of an image (including a still image and a video) and sound.

An accelerator pedal operation amount sensor 37 and an engine actuator 38 are connected to the engine ECU 22. The accelerator pedal operation amount sensor 37 detects an operation amount of an accelerator pedal 39 and outputs a signal representing the detected operation amount of the accelerator pedal 39. The engine ECU 22 drives the engine actuator 38 based on the operation amount of the accelerator pedal 39. As a result, the engine ECU 22 can control a torque (engine generated torque) generated by an engine 40 that is a driving force source of the vehicle 10. The engine generated torque is transmitted to drive wheels via a transmission 44. As described above, the engine ECU 22 controls the drive force of the vehicle 10 by controlling the engine actuator 38.

When the vehicle 10 is a hybrid electric vehicle, the engine ECU 22 can control the drive force of the vehicle 10 generated by either one or both of "an internal combustion engine and a motor" serving as a drive source for traveling of the vehicle 10. When the vehicle 10 is a battery electric vehicle, the engine ECU 22 can control the driving force of the vehicle 10 generated by the electric motor serving as the driving force source for traveling of the vehicle 10.

The driving support ECU 21 can transmit a driving force control command including a target driving force of the vehicle 10 to the engine ECU 22. When the engine ECU 22 receives the driving force control command from the driving support ECU 21, the engine ECU 22 automatically (that is, without requiring an operation of the accelerator pedal 39 by the occupant) controls the engine actuator 38 so that the driving force of the vehicle 10 becomes the target driving force included in the received driving force control command.

A shift lever position sensor 41 and an SBW actuator 42 are connected to the SBW/ECU 23. The shift lever position sensor 41 detects the position of a shift lever 43. The SBW/ECU 23 is configured to acquire the position of the shift lever 43 from the shift lever position sensor 41 and to control the SBW actuator 42 based on the acquired position of the shift lever 43. The SBW actuator 42 switches a shift range of the transmission 44 to a predetermined one of the plurality of shift ranges based on the instruction from the SBW/ECU 23.

The driving support ECU 21 can transmit a shift control command including a target shift range to the SBW/ECU 23. Upon receiving the shift control command from the driving support ECU 21, the SBW/ECU 23 automatically (that is, without requiring an operation of the shift lever 43 by the occupant) controls the SBW actuator 42 so that the shift range of the transmission 44 becomes the target shift range included in the shift control command.

The brake ECU 24 is connected to a brake pedal operation amount sensor 45 and a brake actuator 46. The brake pedal operation amount sensor 45 is configured to detect an operation amount of a brake pedal 47. The brake actuator 46 generates a friction braking force on the wheels by adjusting a hydraulic pressure supplied to a wheel cylinder (not shown) of a friction brake mechanism based on an instruction from the brake ECU 24. Then, the brake ECU 24 operates the brake actuator 46 in accordance with the operation amount of the brake pedal 47 so as to apply a braking force in accordance with the operation amount of the brake pedal 47 to the wheels.

The driving support ECU 21 can transmit a braking force control command, which is a signal including a target braking force, to the brake ECU 24. Upon receiving the braking force control command from the driving support ECU 21, the brake ECU 24 controls the brake actuator 46 so that the braking force of the vehicle 10 becomes the target braking force included in the received braking force control command. As described above, the brake ECU 24 can automatically (that is, without requiring an operation of the brake pedal 47 by the occupant) controls the braking force of the vehicle 10 by driving the brake actuator 46 based on the braking force control command from the driving support ECU 21.

The EPS/ECU 25 is a control device for an electric power steering system. The EPS/ECU 25 is connected to a steering torque sensor 48 and a turning motor driver 49. The steering torque sensor 48 is configured to detect a torque of the rotation operation of the steering wheel 50 by the driver. The turning motor driver 49 drives a turning motor 51. The turning motor 51 can generate a steering assist torque (a torque that assists the driver in rotating the steering wheel 50) and can turn the left and right steered wheels. That is, the turning motor 51 can change a steering angle of the vehicle 10.

The driving support ECU 21 can transmit a steering angle control command including a target steering angle to the EPS/ECU 25. When the EPS/ECU 25 receives the steering angle control command from the driving support ECU 21, the EPS/ECU 25 controls the turning motor driver 49 so that the steering angle of the steered wheel becomes the target steering angle included in the received steering angle control command. In this way, the driving support ECU 21 can automatically (that is, without requiring an operation of the steering wheel 50 by the driver) change the steering angle of the steered wheel of the vehicle 10 via the EPS/ECU 25.

In addition, the vehicle 10 on which the support device 11 is mounted includes an airbag device 52. The airbag device 52 includes an airbag and an airbag control device. The airbag control device is configured to deploy the airbag when it detects an impact equal to or more than a preset level. The airbag device 52 is arranged on, for example, the steering wheel 50, a dashboard, a vehicle door, or the like. The number and arrangement positions of the airbag devices 52 are not particularly limited. The vehicle 10 may be provided with an airbag configured to be deployed when an impact equal to or more than a preset level is applied to the vehicle 10. Then, the driving support ECU 21 can detect that the airbag control device has deployed the airbag.

EDSS Control

As described above, the support device 11 includes the EDSS. When the driving support ECU 21 detects the operation of the EDSS switch 31 (the operation instructing the execution of the EDSS control), the driving support ECU 21 executes the EDSS control. Here, the control of the EDSS by the support device 11 will be briefly described. The driving support ECU 21 continuously determines whether the condition indicating that the driver cannot continue safe driving is satisfied while the vehicle 10 is traveling. Specifically, the driving support ECU 21 executes the following processes A to C in parallel. The "condition indicating that the driver can no longer continue safe driving" may be referred to as an "EDSS condition".

Process A: The driving support ECU 21 continuously acquires a detection result of whether the steering wheel 50 is being touched, from the steering touch sensor 34. Then, the driving support ECU 21 determines that the EDSS condition is satisfied when the state in which the touch to the steering wheel 50 is not detected while the vehicle 10 is traveling continues for a first time period. The length of the first time period is not specifically limited and can be set as appropriate.

Process B: While the vehicle 10 is traveling, the driving support ECU 21 continuously executes a process of "acquiring an image of the driver's face taken by the driver monitor camera 35 and performing image processing on the acquired image of the driver's face so as to identify the direction of the driver's line of sight and the direction of the driver's face". Then, the driving support ECU 21 determines that the EDSS condition is satisfied when a state in which the specified direction of the driver's line of sight is out of a predetermined range is continued for a second time period, or a state in which the direction of the driver's face is out of a predetermined range is continued for a third time period. The "predetermined range" is a range including a direction when the driver is looking ahead of the vehicle 10. Further, the second time period, the third time period, and the predetermined range are not specifically limited and can be set as appropriate. A method of determining whether the driver is in a state where the vehicle 10 can be safely driven by using an image of the driver's face is known (see, for example, Japanese Patent Application Publication No. 2013-152700 (JP 2013-152700 A)), and the known method can be applied to the process B of the present embodiment.

Process C: The driving support ECU 21 continuously acquires the operating amount of the accelerator pedal 39, the operating amount of the brake pedal 47, and the steering angle of the steering wheel 50. Then, when the vehicle speed is equal to or higher than the predetermined vehicle speed, in case where a state in which the operation amount of the accelerator pedal 39, the operation amount of the brake pedal 47, and the steering angle of the steering wheel 50 do not change continues for a fourth time period, the driving support ECU 21 determines that the EDSS condition is satisfied. Instead of the determination whether the state where the steering angle of the steering wheel 50 does not changed continues for the fourth time period (or in addition to the determination whether the state where the steering angle of the steering wheel 50 does not change continues for the fourth hour), the driving support ECU 21 may determine whether the state in which the steering torque detected by the steering torque sensor 48 does not change continues for a fifth time period. The specific lengths of the fourth time period and the fifth time period are not limited and can be set as appropriate.

When the driving support ECU 21 determines that the EDSS condition is satisfied by any of the above processes A to C, the driving support ECU 21 starts automatic stop control. The automatic stop control is a part of the control of the EDSS, and is a control that decelerates the vehicle 10 by a predetermined deceleration (hereinafter, may be referred to as "automatic deceleration") without an operation of the brake pedal 47 of the driver. The value of the automatic deceleration is registered in the driving support ECU 21 in advance. In this way, when the driving support ECU 21 determines that the EDSS condition is satisfied, the vehicle 10 is stopped by executing the automatic stop control.

Even when the driving support ECU 21 detects the operation of the accelerator pedal 39 after the start of the automatic stop control, the driving support ECU 21 continues the automatic stop control regardless of the operation amount of the accelerator pedal 39 (that is, continues decelerating the vehicle 10 and stops the vehicle 10). When the driving support ECU 21 detects the operation of the brake pedal 47 after the start of the automatic stop control, in a case in which the deceleration of the vehicle 10 based on the operation amount of the brake pedal 47 is larger than the automatic deceleration, the vehicle 10 is decelerated based on the operation amount of the brake pedal 47. On the other hand, when the deceleration of the vehicle 10 based on the operation amount of the brake pedal 47 is smaller than the automatic deceleration, the driving support ECU 21 decelerates the vehicle 10 by the automatic deceleration.

The driving support ECU 21 may execute a lane keeping control (LKA: lane keep assist control) as a part of the EDSS control from the start of the automatic deceleration control until the vehicle 10 is stopped. The lane keeping control is a control for maintaining the position of the vehicle 10 in the vicinity of a target traveling line (for example, in the vicinity of a roadside zone) in a "lane (traveling lane) in which the vehicle 10 is traveling". The lane keeping control itself is well known (see, for example, Japanese Unexamined Patent Application Publication No. 2008-195402 (JP 2008-195402 A), Japanese Unexamined Patent Application Publication No. 2009-190464 (JP 2009-190464 A), Japanese Unexamined Patent Application Publication No. 2010-6279 (JP 2010-6279 A), Japanese Patent No. 4349210 (JP 4349210 B), and the like).

Abnormality Handling Support Control

Next, the abnormality handling support control will be described. The abnormality handling support control is a control "that determines whether a display condition including that an abnormal condition is satisfied is satisfied, in which the abnormal condition indicates that an abnormality has occurred in the vehicle 10 or the driver of the vehicle 10 while the vehicle 10 is traveling, and when it is determined that the display condition is satisfied, a support image for proposing a handling method of a predetermined abnormality is displayed on the touch panel display 361 of the HMI 36". When the support image is a video including sound, the speaker 362 of the HMI 36 is made to deliver the sound. The "abnormality of the vehicle 10" includes an accident of the vehicle 10 (such as a collision accident) and an abnormality (fault) of the device mounted on the vehicle 10. "Determining whether the display condition including that the abnormal condition is satisfied is satisfied" includes "determining that the display condition is satisfied when the abnormal condition is satisfied" and "the display condition is satisfied when another condition different from the abnormal condition is satisfied." The support image is an image relating to a method of handling an abnormality and is an image associated with the abnormality, and is an example of a first image of the present disclosure. The support image includes not only "an image that directly presents a handling method for a predetermined abnormality" but also "an image that presents information for handling a predetermined abnormality (for example, information estimated to be used when handling the abnormality."

The abnormal condition includes a first abnormal condition, a second abnormal condition, and a third abnormal condition. The first abnormal condition, the second abnormal condition, and the third abnormal condition are conditions indicating the occurrence of abnormalities having different contents from each other. The contents of the abnormality handling support control (specifically, the contents of each abnormality condition, the method of determining whether each abnormality condition is satisfied, and the support image displayed on the touch panel display 361 of the HMI 36 when the display condition is satisfied) will be explained for each abnormal condition.

First Abnormal Condition

The first abnormal condition is a condition indicating that an abnormality has occurred for the driver. In the present embodiment, as the first abnormal condition, the above-mentioned EDSS condition that is a condition indicating that the driver cannot continue safe driving is used. That is, the driving support ECU 21 determines whether the first abnormal condition is satisfied by executing the above-mentioned processes A to C in parallel while the vehicle 10 is traveling. This first abnormal condition corresponds to the abnormal condition of the present disclosure. When the driving support ECU 21 determines that the first abnormal condition is satisfied (when it is determined that the EDSS condition is satisfied), the driving support ECU 21 determines that the display condition is satisfied. This display condition corresponds to the presentation condition of the present disclosure. Then, when the driving support ECU 21 determines that the display condition is satisfied, the driving support ECU 21 ends the display of the image previously displayed on the touch panel display 361 of the HMI 36 (erases the image that was displayed until the display condition is satisfied), and starts displaying the support image.

When the first abnormal condition (EDSS condition) is satisfied, there is a possibility that the driver has lost consciousness. Thus, as the support image for presenting a handling method for the abnormality that has occurred to an occupant other than the driver of the vehicle 10 or a person other than the occupant, stored in the driving support ECU 21 is a video showing how to use an automated external defibrillator (hereinafter referred to as an AED), a video showing the procedure of cardiopulmonary resuscitation, and an image 61 (hereinafter referred to as an "driver information image 61") presenting information about the driver. The video showing how to use the AED and the video showing the procedure of cardiopulmonary resuscitation are examples of the above-mentioned "image that directly presents a handling method for a predetermined abnormality". The driver information image 61 is an example of the above-mentioned "image presenting information for handling a predetermined abnormality".

Figures 2, 3:
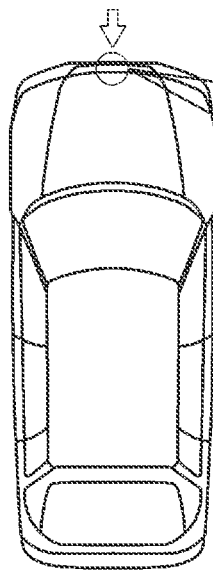
FIG. 2 is a diagram showing an example of a driver information image that is a support image.
FIG. 3 is a diagram showing an example of the support image.

FIG. 2 is a diagram showing an example of the driver information image 61. As shown in FIG. 2, the driver information image 61 includes information on the driver's emergency contact information, the driver's pre-existing illness, and medicine that the driver cannot use. However, the information about the driver included in the driver information image 61 is not limited to the information shown in FIG. 2. For example, information regarding the driver's name and address may be included in the driver information image 61.

When the driving support ECU 21 determines that the display condition is satisfied due to the first abnormality condition being satisfied, the driving support ECU 21 displays one support image that is associated with the first abnormality condition, among the plurality of support images stored (registered) in the driving support ECU 21. "The support image associated with the first abnormal condition" can also be considered "a support image that is preset to be displayed on the touch panel display 361 of the HMI 36 when the display condition is satisfied due to the first abnormal condition being satisfied".

The driving support ECU 21 may determine that the display condition is satisfied when the driving support ECU 21 determines that the first abnormal condition is satisfied and when the vehicle 10 is stopped by the automatic stop control executed due to the first abnormal condition being satisfied. In this case, the driving support ECU 21 causes the touch panel display 361 to start displaying the support image when the vehicle 10 is stopped by the automatic stop control. Further, in this case, from the start of the automatic stop control until the vehicle 10 is stopped (that is, while the automatic stop control is being executed), the driving support ECU 21 may display an image for notifying the occupant that "the display of the support image is started after the vehicle is stopped" on the touch panel display 361. This image is hereinafter referred to as a "preliminary image". The preliminary image is an example of a second image of the present disclosure. The preliminary image includes a message for informing (notifying) that the support image is displayed after the vehicle 10 is stopped, such as "a video showing how to use the AED will be shown after the vehicle is stopped". Then, when the vehicle 10 is stopped by the automatic stop control, the driving support ECU 21 ends the display of the preliminary image of the touch panel display 361 (erases the preliminary image) and starts displaying the support image.

Then, after the start of displaying the support image, the driving support ECU 21 determines whether the predetermined end condition is satisfied. For example, when the driving support ECU 21 detects an operation on a specific switch provided in the HMI 36, the driving support ECU 21 determines that the end condition is satisfied and ends the display of the support image. Then, the driving support ECU 21 resumes displaying the image that was displayed before the display of the support image or the image that was displayed before the display of the preliminary image.

Second Abnormal Condition

The second abnormal condition is a condition indicating that an abnormality has occurred in the vehicle 10 (an accident has occurred). In the present embodiment, the driving support ECU 21 determines that the second abnormality condition is satisfied when the airbag of the airbag device 52 is deployed. When the driving support ECU 21 determines that the second abnormal condition is satisfied, it determines that the display condition is satisfied. Then, when the driving support ECU 21 determines that the display condition is satisfied, the driving support ECU 21 ends the display of the image previously displayed on the touch panel display 361 of the HMI 36 (erases the image that was displayed until the display condition is satisfied), and starts displaying the support image.

When the second abnormal condition is satisfied, since there is a possibility that the occupant has received an impact, there is a possibility that the occupant has lost consciousness or has been injured. Thus, as the support image for presenting the handling method for the abnormality that has occurred, stored in the driving support ECU 21 are the video showing how to use an AED, the video showing the procedure of cardiopulmonary resuscitation, the driver information image 61, a video showing how to stop bleeding, a video showing a first aid method for fractures, and a video showing a procedure of artificial respiration. The video showing how to use an AED, the video showing the procedure of cardiopulmonary resuscitation, the driver information image 61, the video showing how to stop bleeding, the video showing the first aid method for fractures, and the video showing the procedure of artificial respiration are "images that directly present a handling method for a predetermined abnormality." The driver information image 61 is the above-mentioned "image presenting information for handling a predetermined abnormality".

When the driving support ECU 21 determines that the display condition is satisfied due to the second abnormality condition being satisfied, the driving support ECU 21 displays, among the support images, one support image that is associated with the second abnormality condition on the touch panel display 361 of the HMI 36. "The support image associated with the second abnormal condition" can also be considered "a support image that is preset to be displayed on the touch panel display 361 of the HMI 36 when the display condition is satisfied due to the second abnormal condition being satisfied". Then, after the start of displaying the support image, the driving support ECU 21 continuously executes the determination whether the end condition is satisfied. The same conditions and operations as those under the first abnormal condition can be applied to the end condition and the operations when the end condition is satisfied.

Third Abnormal Condition

The third abnormality condition is a condition indicating that an abnormality has occurred in the vehicle 10 (an abnormality has occurred in a device mounted on the vehicle 10). In this embodiment, an example is shown in which the device mounted on the vehicle 10 is the peripheral sensor 32, and an abnormality of the device mounted on the vehicle 10 is "dirt on a sensor surface of the peripheral sensor 32." The sensor surface is a surface of a portion that is exposed to the outside of the vehicle 10, among a lens of the peripheral sensor 32, a cover that transmits electromagnetic waves or ultrasonic waves emitted by the peripheral sensors, and glass that transmits electromagnetic waves or ultrasonic waves received by the peripheral sensor. The driving support ECU 21 determines whether the third abnormality condition is satisfied by using the following sensor surface dirt index value.

The sensor surface dirt index value is a parameter indicating the degree of dirt on the sensor surface. Specifically, the sensor surface dirt index value of the radar sensor 321 is "a magnitude of millimeter wave attenuation due to the dirt of the sensor surface" defined as follows.

Sensor surface dirt index value=(millimeter wave emission intensity)/(millimeter wave (reflected wave)incident intensity)

The emission intensity of the millimeter wave is the intensity of the millimeter wave emitted from the radar sensor 321 toward the outside of the vehicle. The incident intensity of the millimeter wave is the intensity of the millimeter wave detected by the radar sensor 321. Then, when the sensor surface dirt index value is equal to or higher than a predetermined dirt threshold value, the driving support ECU 21 determines that the third abnormality condition is satisfied. The specific value of the dirt threshold value is not particularly limited and can be set as appropriate. Further, the sensor surface dirt index value of the ultrasonic sensor 322 can be calculated by the same method as the sensor surface dirt index value of the radar sensor 321. That is, in the above equation, "millimeter wave" may be replaced with "ultrasonic wave".

The sensor surface dirt index value of the camera 323 is "a ratio of an area of a dirty region to an area of an image (photographed image) taken by the camera 323" defined as follows.

Sensor surface dirt index value=(area of dirty region in captured image)/(total area of captured image)

The dirty region in the captured image is a region in which a brightness hardly changes for a predetermined period (time) or longer (that is, a region in which the change in brightness is equal to or less than a threshold value). The driving support ECU 21 acquires image data from each camera 323 and calculates a sensor surface dirt index value using the acquired image data.

When the third abnormality condition is satisfied, the sensor surface of any one of the plurality of peripheral sensors 32 is dirty. Further, the driving support ECU 21 stores (registers) an image 62 as shown in FIG. 3 and an image showing contact information of a maintenance shop of the vehicle 10 as the support image. FIG. 3 is an example of the support image associated with the third abnormal condition. As shown in FIG. 3, the image 62 includes an image showing the position of the dirty sensor surface and a message prompting the dirty sensor surface to be cleaned. The image 62 shown in FIG. 3 is the above-mentioned "image that directly presents a handling method for a predetermined abnormality", and the image that presents the contact information of the maintenance shop of the vehicle 10 is the above-mentioned "image presenting information for handling a predetermined abnormality."

When the driving support ECU 21 determines that the display condition is satisfied due to the third abnormality condition being satisfied, the driving support ECU 21 erases the image that was previously displayed on the touch panel display 361 of the HMI 36, and the driving support ECU 21 displays one support image that is associated with the third abnormality condition, among the support images. Then, after the start of displaying the support image, the driving support ECU 21 continuously executes the determination whether the end condition is satisfied. For example, the driving support ECU 21 continuously executes the determination of whether the sensor surface dirt index value of each peripheral sensor 32 is equal to or more than the dirt threshold value, and when the driving support ECU 21 determines that the sensor surface dirt index values of all the peripheral sensors 32 are less than the dirt threshold value, the driving support ECU 21 determines that the end condition is satisfied. Further, similar to the case of the first abnormal condition, when the driving support ECU 21 detects an operation on a specific switch provided in the HMI 36, the driving support ECU 21 may determine that the end condition is satisfied. The operation after the end condition is satisfied is the same as that of the first abnormal condition.

Modified Example of Display Mode

In the above description, shown is a configuration in which the driving support ECU 21 displays one support image on the touch panel display 361 of the HMI 36 when the driving support ECU 21 determines that the display condition is satisfied. However, the driving support ECU 21 may display a plurality of support images. For example, when the driving support ECU 21 determines that the display condition is satisfied due to the first abnormal condition being satisfied, the driving support ECU 21 may simultaneously display the video showing how to use the AED and the driver information image 61, and the driving support ECU 21 may simultaneously display the video showing the procedure of the cardiopulmonary resuscitation method and the driver information image. Similarly, when the driving support ECU 21 determines that the display condition is satisfied due to the second abnormal condition being satisfied, the driving support ECU 21 may simultaneously display two or more of the video showing how to use the AED, the video showing the procedure of cardiopulmonary resuscitation, the driver information image 61, the video showing how to stop bleeding, the video showing the first aid method for fractures, and the video showing the procedure of artificial respiration. Further, when the driving support ECU 21 determines that the display condition is satisfied due to the third abnormal condition being satisfied, the driving support ECU 21 may An image showing the position of the dirty sensor surface and an image including a message indicating that the sensor surface is dirty, and an image showing the contact information of the maintenance shop of the vehicle 10 may be displayed simultaneously.

Setting Support Image to be Displayed

Figure 4:
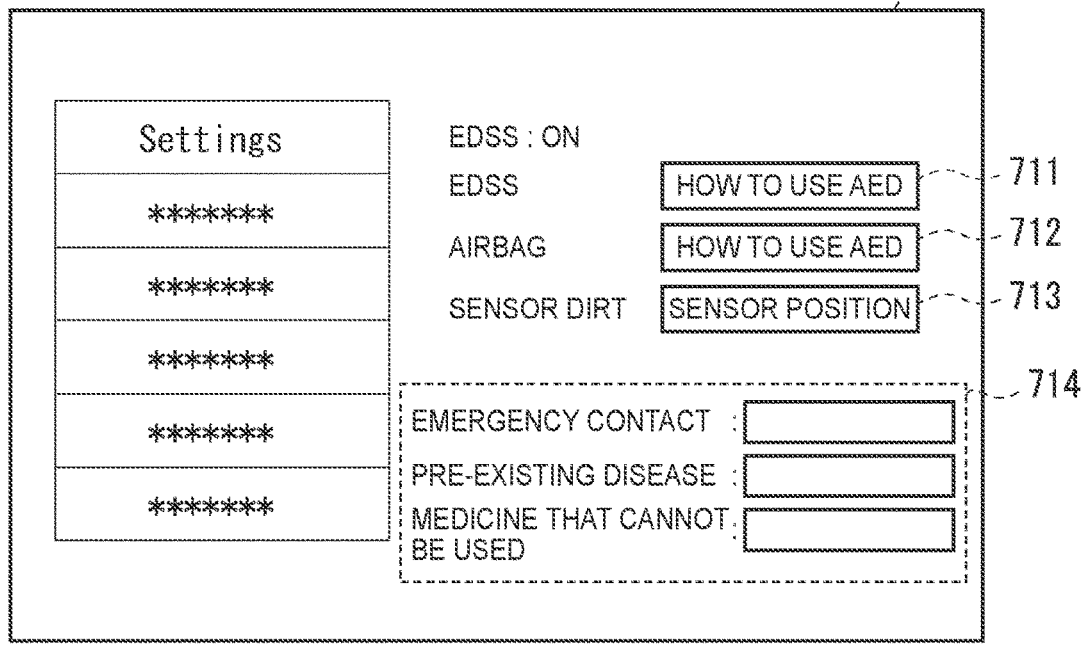
FIG. 4 is a diagram showing an example of a first menu image.
Figure 5:
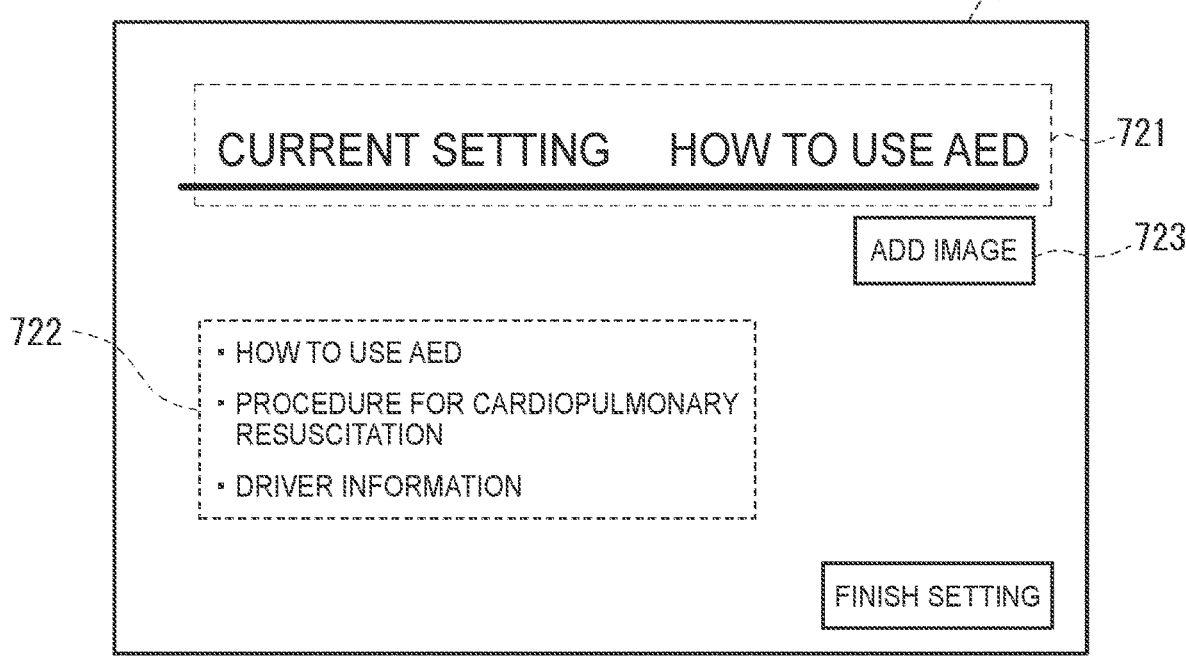
FIG. 5 is a diagram showing an example of a second menu image.

The support device 11 is configured so that the support image to be displayed on the touch panel display 361 of the HMI 36 can be set by the operation of the user when the display condition is satisfied due to each abnormal condition being satisfied. FIGS. 4 and 5 are images for setting the support image to be displayed when the display condition is satisfied. These images are displayed on the touch panel display 361. For convenience of explanation, the image shown in FIG. 4 is referred to as a first menu image 71, and the image shown in FIG. 5 is referred to as a second menu image 72.

When the driving support ECU 21 detects a predetermined operation (operation for displaying the first menu image 71) on the HMI 36, the driving support ECU 21 displays the first menu image 71 shown in FIG. 4 on the touch panel display 361 of the HMI 36. The first menu image 71 includes a region 711 for displaying the name of the support image currently associated with the first abnormal condition, a region 712 for displaying the name of the support image currently associated with the second abnormal condition, and a region 713 for displaying the name of the support image currently associated with the third abnormality condition. When the driving support ECU 21 detects a touch operation on any of these regions 711, 712, 713, the driving support ECU 21 erases the first menu image 71 and displays the second menu image 72 shown in FIG. 5. Note that FIG. 5 shows an example of the second menu image 72 displayed when the region 711 displaying the name of the support image currently associated with the first abnormal condition is touched.

As shown in FIG. 5, the second menu image 72 includes a first region 721, a second region 722, and an image addition button image 723. The first region 721 is a region for displaying the name of the support image associated with the first abnormal condition. The second region 722 is a region in which the names of the support images stored (registered) in the driving support ECU 21 are listed as the support images that can be associated with the first abnormal condition. The image addition button image 723 is an image to be touch-operated when a new support image is added.

When the driving support ECU 21 detects a touch operation for any of the names of the plurality of support images listed in the second region 722, the driving support ECU 21 sets the support image corresponding to the name of the touch-operated support image as the support image associated with each abnormal condition, and displays the name of the set support image in the first region 721. In this way, the user or the like of the vehicle 10 can select the support image associated with each abnormal condition from the plurality of support images stored (registered) in the driving support ECU 21.

Further, the driving support ECU 21 is configured so that the support image can be additionally stored (registered) by the user or the like. Specifically, when a storage device is connected to the interface of the driving support ECU 21 (or wireless communication with an external computer is satisfied) and a touch operation on the image addition button image 723 is detected while the second menu image 72 is displayed on the touch panel display 361 of the HMI 36, a video (video file) stored in the connected storage device (or the external computer with satisfied wireless communication) is searched, and a file name of the detected video is displayed on the touch panel display 361 of the HMI 36. Then, when the driving support ECU 21 detects a touch operation on the file name of the video, the video (video file) corresponding to the file name is read from the storage device and is stored in the readable/writable non-volatile memory of the driving support ECU 21. Then, when the driving support ECU 21 subsequently displays the first menu image 71, the file name of the support image stored by the operation is displayed in the second region 722. Thus, the user can set the video stored by the operation as the support image associated with the first abnormal condition.

In an initial state of the support device 11 (a state in which an operation for changing the setting has not yet been performed), in the driving support ECU 21, a predetermined one image of the video showing how to use the AED, the video showing the procedure of cardiopulmonary resuscitation, and the driver information image 61 is set as the support image to be displayed when the first abnormal condition is satisfied. For example, in the initial state, the first abnormal condition and the second abnormal condition are associated with the video showing how to use the AED, and the third abnormal condition is associated with the image that indicates the position of the dirty sensor surface and the image including a message indicating that the sensor surface is dirty (see FIG. 3).

Further, the driving support ECU 21 is configured so that each item of the driver information image 61 can be registered by the user or the like of the vehicle 10. As shown in FIG. 4, the first menu image 71 includes a region 714 for displaying each item of the driver information. Then, when the driving support ECU 21 detects a touch operation on each item included in this region 714, it displays an image for inputting characters and numbers in the touch-operated item. Thus, the user or the like of the vehicle 10 can input characters and numbers in each item by performing touch operation on this image. Then, the driving support ECU 21 stores (registers) the input characters and numbers as the contents of each item. In the initial state, each item of the driver information image 61 is blank.

Action and Effect of the Present Embodiment

As described above, when the driving support ECU 21 determines that the display condition is satisfied, in which the display condition includes that any one of the first abnormality condition to the third abnormality condition is satisfied, the driving support ECU 21 displays the support image associated with the satisfied abnormality condition on the touch panel display 361 of the HMI 36. The support image associated with each abnormality condition is the image for presenting the handling method for the abnormality that caused the abnormality condition to be satisfied, and is the image that presents the method for directly handling the abnormality or the information for the abnormality. Thus, since the occupant of the vehicle 10 and/or the person present in the vicinity of the vehicle 10 can know the appropriate handling method for the occurred abnormality, an appropriate countermeasure can be immediately taken for the occurred abnormality.

In particular, when the first abnormal condition is satisfied, there is a possibility that the driver has lost consciousness. Thus, according to the present embodiment, an occupant other than the driver of the vehicle 10 and/or a person present in the vicinity of the vehicle 10 can take appropriate measures for the driver's abnormality (for example, carrying out appropriate rescue activities for the driver) by viewing this support image.

Further, since the driving support ECU 21 starts displaying the support image after the vehicle 10 is stopped by the automatic stop control, it is possible to prevent or suppress the occupant other than the driver from moving in the vehicle or moving the body of the driver so as to take rescue measures for the driver until the vehicle 10 is stopped. That is, when the driving support ECU 21 starts displaying the support image before the vehicle 10 is stopped, there is a case in which the occupant other than the driver who saw the support image moves in the vehicle or moves the body of the driver so as to take measures before the vehicle 10 is stopped. According to the present embodiment, since the support image is not displayed until the vehicle 10 is stopped, it is possible to prevent or suppress the occupant other than the driver from moving in the vehicle or moving the body of the driver so as to perform rescue measures for the driver. Therefore, the safety of the occupant of the vehicle 10 can be enhanced.

Further, in a case in which the configuration is such that the preliminary image is displayed until the vehicle 10 stops when the first abnormal condition is satisfied, the occupant of the vehicle 10 can recognize that "the occupant can know an appropriate handling method for the abnormality that has occurred after the vehicle is stopped". Thus, it is possible to enhance the effect of preventing or suppressing the occupant other than the driver from moving in the vehicle 10 or moving the body of the driver so as to perform measures for the abnormality of the driver before the vehicle 10 is stopped.

Then, suppose the configuration is such that one of the video showing how to use the AED, the video showing the procedure of cardiopulmonary resuscitation, and the image presenting information about the driver is shown when it is determined that the display condition is satisfied due to the first abnormal condition being satisfied. In such a case, when the abnormality occurs regarding the driver, the occupant other than the driver of the vehicle 10 and/or the person present in the vicinity of the vehicle 10 can be notified of the appropriate treatment method for the abnormality of the driver.

Specific Operation of the Driving Support ECU

Figure 6:
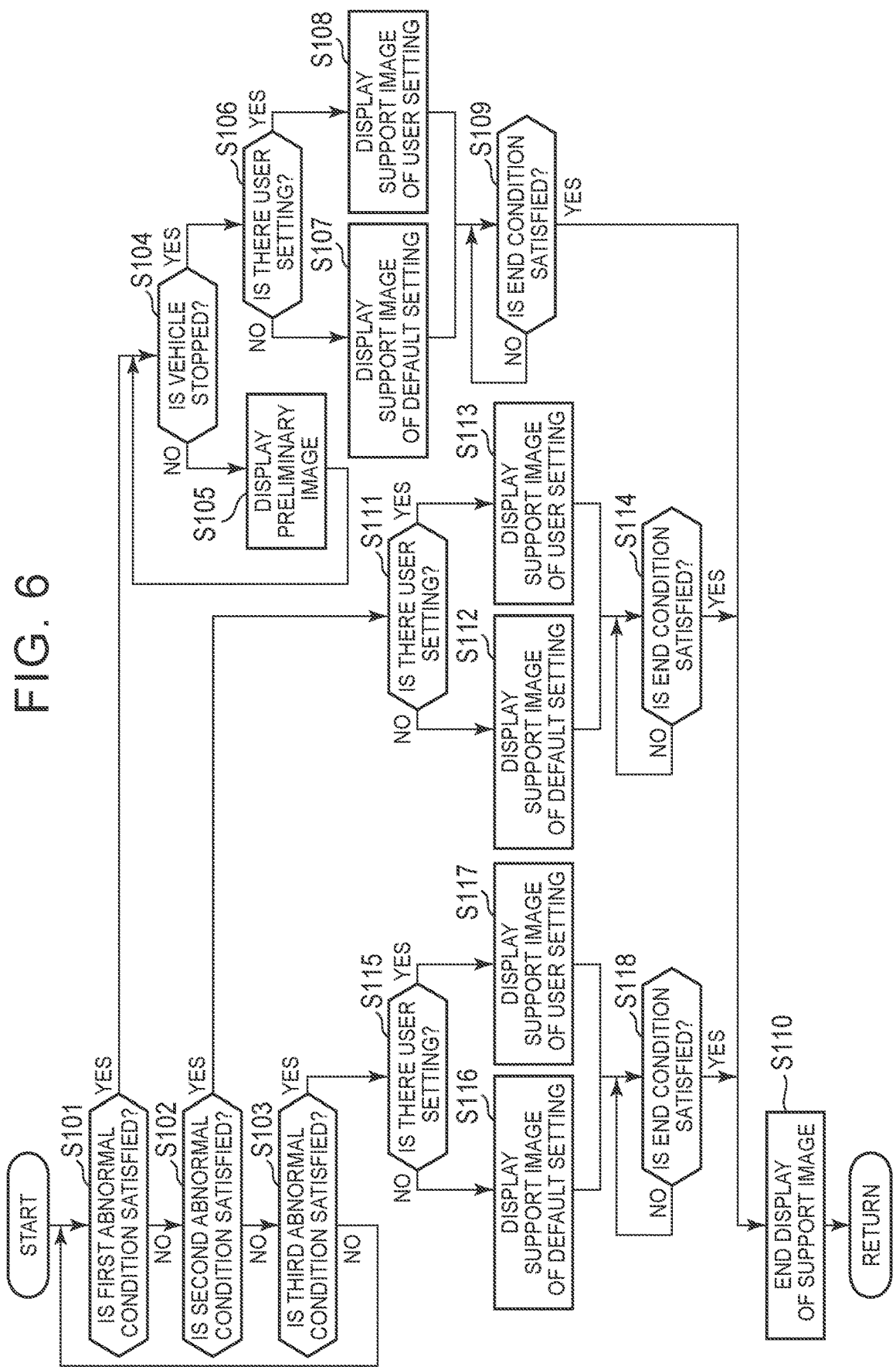
FIG. 6 is a flowchart showing an abnormality handling support routine.

Next, the specific operation of the driving support ECU 21 will be described with reference to FIG. 6. FIG. 6 is a flowchart showing an abnormality handling support routine executed by the CPU of the driving support ECU 21. The operation when the driving support ECU 21 is executing the control of the EDSS is shown. This abnormality handling support routine is stored in advance in the ROM of the computer of the driving support ECU 21 or a readable and writable non-volatile memory. The CPU reads this abnormality handling support routine from the ROM or the readable and writable non-volatile memory, expands it to the RAM, and executes it. Further, the CPU of the driving support ECU 21 repeatedly executes this abnormality handling support routine at a predetermined cycle. In the following description, the CPU of the driving support ECU 21 may be simply abbreviated as a "CPU".

In step S101, the CPU determines whether the first abnormal condition is satisfied. When the CPU determines that the first abnormal condition is not satisfied, the CPU proceeds to step S102. On the other hand, when the CPU determines that the first abnormal condition is satisfied, the CPU proceeds the process to step S104.

In step S102, the CPU determines whether the second abnormality condition is satisfied. When the CPU determines that the second abnormality condition is not satisfied, the CPU proceeds the process to step S103. On the other hand, when the CPU determines that the second abnormality condition is satisfied, the CPU advances the process to step S111.

In step S103, the CPU determines whether the third abnormality condition is satisfied. When the CPU determines that the third abnormality condition is not satisfied, the CPU returns the process to step S101. In this way, the CPU repeats the determination of whether any of the first abnormal condition to the third abnormal condition is satisfied while none of the first abnormal condition to the third abnormal condition is satisfied. On the other hand, when the CPU determines that the third abnormality condition is satisfied, the CPU proceeds to step S115.

In step S104, the CPU determines whether the vehicle 10 is stopped based on the vehicle speed detection result of the vehicle speed sensor 33. When the vehicle 10 is not stopped, the CPU advances the process to step S105. On the other hand, when the vehicle 10 is stopped, the CPU determines that the display condition is satisfied. Then, the CPU advances the process to step S106.

In step S105, the CPU erases the image currently displayed on the touch panel display 361 of the HMI 36 (ends the display of the currently displayed image), and starts displaying the preliminary image. When the CPU has already started displaying the preliminary image, the CPU continues to display the preliminary image. Then, the CPU returns the process to step S104.

In step S106, the CPU determines whether the operation of associating the specific support image with the first abnormal condition has already been performed (in other words, whether the user has set the support image association). When the operation of associating the specific support image with the first abnormal condition has not yet been performed (when the user has not set the correspondence of the support image), the CPU advances the process to step S107. On the other hand, when the operation of associating the specific support image with the first abnormal condition has already been performed (when the user has set the correspondence of the support image), the CPU proceeds to the process in step S108.

In step S107, the CPU erases the image currently displayed on the touch panel display 361 of the HMI 36, and displays the support image (default setting support image) associated with the first abnormal condition in the initial state on the touch panel display 361 of the HMI 36. In the present embodiment, the CPU displays a video showing how to use the AED on the touch panel display 361 of the HMI 36. Then, the CPU advances the process to step S109.

In step S108, the CPU erases the image currently displayed on the touch panel display 361 of the HMI 36, and displays the support image (support image set by the user) associated with the first abnormal condition according to the user's setting on the touch panel display 361 of the HMI 36. Then, the CPU advances the process to step S109.

In step S109, the CPU determines whether a display end condition is satisfied. When the CPU determines that the display end condition is not satisfied, the CPU repeats the process of step S109. On the other hand, when the CPU determines that the display end condition is satisfied, the CPU proceeds to step S110.

In step S110, the CPU ends the display of the support image and resumes the display of the image that was displayed before the first abnormal condition was satisfied (in other words, before the display of the preliminary image). Then, the CPU temporarily ends the abnormality handling support routine.

The contents of the processes of steps S111 to S114 performed when the second abnormal condition is satisfied and the processes of steps S115 to S118 performed when the third abnormal condition is satisfied are almost the same as the processes of steps S106 to S109 performed when the first abnormal condition is satisfied, except that the support images to be displayed may be different. Thus, the description thereof will be omitted.

According to such an abnormality handling support routine, the above-mentioned abnormality handling support control is realized. Specifically, the CPU repeatedly executes this determination until it is determined that any of the first abnormal condition to the third abnormal condition is satisfied (steps S101 to S103). When the CPU determines that the first abnormal condition is satisfied while the vehicle 10 is traveling ("Y" in step S101 and "N" in step S104), the touch panel display 361 of the HMI 36 displays the preliminary image until the vehicle 10 stops (step S105). When the vehicle 10 stops after the start of displaying the preliminary image ("Y" in step S104), the CPU determines that the display condition is satisfied. In this case, the CPU ends the display of the preliminary image and starts displaying the support image (step S107 or S108). When the operation of associating the support image with the first abnormal condition has already been performed ("Y" in step S106), the support image associated with the first abnormal condition is displayed by this operation (step S108). On the other hand, when this operation has not yet been performed ("N" in step S106), the support image associated with the first abnormal condition in the initial state is displayed (step S107).

When it is determined that the second abnormal condition is satisfied ("Y" in step S102), the CPU determines that the display condition is satisfied. In this case, the CPU displays the support image associated with the second abnormality condition on the touch panel display 361 of the HMI 36 (step S112 or S113). Similarly, when it is determined that the third abnormal condition is satisfied ("Y" in step S103), the CPU determines that the display condition is satisfied. In this case, the CPU displays the support image associated with the third abnormality condition on the touch panel display 361 of the HMI 36 (step S116 or S117).

Although the embodiment of the present disclosure has been described above, the present disclosure is not limited to the above embodiment. In the present disclosure, various modifications can be adopted without departing from the spirit of the present disclosure.

For example, in the above embodiment, the configuration is such that the HMI 36 includes the touch panel display 361, and the driving support ECU has the image (the first menu image and the second menu image) for setting the support image, the preliminary image, and the support image on the touch panel display 361. However, the configuration is not limited to such a configuration. For example, the HMI 36 may be connected to a meter (for example, a meter panel, etc.) capable of displaying an image (or the HMI 36 may have a meter capable of displaying an image). The driving support ECU 21 may display each of the above images on the meter. Further, the support device 11 may have a switch (for example, an operation button provided on the steering wheel or the like) that can be operated by the occupant of the vehicle 10 in addition to the EDSS switch 31. In this case, the driving support ECU 21 may associate the support image with each abnormal condition, store the support image, register the contents of each item of the driver information image 61, and the like based on the operation on the switch. As described above, the device (presentation device (display device) of the present disclosure) for displaying the support image, the preliminary image, and the image for setting the support image is not limited to the touch panel display 361. Further, the device operated by the occupant of the vehicle 10 for associating the support image with each abnormal condition and registering the contents of each item of the driver information image 61 is not limited to the touch panel display 361.

Further, in the above embodiment, the configuration in which the HMI 36 is connected to the driving support ECU 21 is shown. However, the support device 11 is not limited to such a configuration. The support device 11 may have a GNSS device, and the HMI 36 may be connected to the ECU of the GNSS device. GNSS is an abbreviation for Global Navigation Satellite System. The GNSS device is a device configured to measure a geographical position and orientation of the vehicle 10 based on radio waves received from a satellite. In such a configuration, the ECU of the GNSS device usually controls the HMI 36 (specifically, while the display condition is not satisfied). Then, the ECU of the GNSS device displays a navigation image on the touch panel display 361 of the HMI 36 when the ignition switch of the vehicle 10 is ON (or when the main power switch of the vehicle 10 is ON). The navigation image is an image showing the geographical position of the vehicle 10, road information, and the like. Then, when it is determined that the display condition is satisfied, the driving support ECU 21 acquires a control right of the HMI 36 from the ECU of the GNSS device and displays the support image (or the preliminary image) on the touch panel display 361.

Further, in the above-described embodiment, the configuration for determining whether the driver can safely drive the vehicle 10 by any of the processes A to C is shown. However, the process of determining whether the driver is in a state in which the driver is able to safely drive the vehicle 10 is not limited to these processes A to C. For example, the support device 11 may be provided with a confirmation switch that can be operated by the driver of the vehicle 10, and in addition to the processes A to C, as a process D, the driving support ECU 21 may perform a process of making an announcement to the driver to prompt the driver to operate the confirmation switch as a predetermined time elapses and also determining whether the confirmation switch has been operated. In this case, the driving support ECU 21 may determine that the driver is not in a state where the vehicle 10 can be safely driven when the operation of the confirmation switch is not detected for a predetermined time or longer.

Further, in the above-described embodiment, shown is a configuration in which the driving support ECU 21 executes the abnormality handling support control. However, a device other than the driving support ECU 21 may execute the abnormality handling support control. In addition, the support device 11 may have other ECUs other than the driving support ECU 21, the engine ECU 22, the SBW/ECU 23, the brake ECU 24, and the EPS/ECU 25, and the other ECUs may execute the abnormality handling support control. Further, a plurality of devices may cooperate to execute the abnormality handling support control. As described above, the device that executes the abnormality handling support control is not limited.

Further, in the embodiment described above, shown as an example is a configuration in which the abnormality handling support control is the control "that determines whether the display condition including that the abnormal condition is satisfied is satisfied, in which the abnormal condition indicates that the abnormality has occurred in the vehicle 10 or the driver of the vehicle 10 while the vehicle 10 is traveling is satisfied, and when it is determined that the display condition is satisfied, the support image for proposing the handling method of a predetermined abnormality is displayed on the touch panel display 361 of the HMI 36". However, the configuration is not limited to this. For example, the abnormality handling support control may be a control "that determines whether an utterance condition including that the abnormal condition indicating that the abnormality has occurred in the vehicle 10 or the driver of the vehicle 10 while the vehicle 10 is traveling is satisfied is satisfied, and when it is determined that the utterance condition is satisfied, a sound for proposing the handling method of the predetermined abnormality is delivered from the speaker 362 of the HMI 36". In this case, the utterance condition corresponds to the presentation condition of the present disclosure. That is, the abnormality handling support control is a control "that determines whether the presentation condition including that the abnormal condition indicating that the abnormality has occurred in the vehicle 10 or the driver of the vehicle 10 while the vehicle 10 is traveling is satisfied is satisfied, and when it is determined that the presentation condition is satisfied, the support image for proposing the handling method of the predetermined abnormality is presented on the presentation device.

Further, in the above embodiment, shown is a configuration in which the vehicle 10 has the engine 40 (internal combustion engine) as a driving force source for traveling. However, the vehicle 10 to which the present disclosure is applicable is not limited to such a configuration. For example, the vehicle 10 may be a hybrid electric vehicle or a battery electric vehicle.

Further, the vehicle 10 does not need to include all of the plurality of radar sensors 321, the plurality of ultrasonic sensors 322, and the plurality of cameras 323 as the peripheral sensor 32, and only needs to include at least one of the radar sensor 321, the ultrasonic sensor 322, and the camera 323. Further, in the above embodiment, the abnormality of the device mounted on the vehicle 10 for determining whether the second abnormality condition is satisfied is not limited to dirt on the sensor surface of the peripheral sensor 32.

Further, in the present embodiment, shown is a configuration in which the support device 11 is provided with the EDSS switch 31, and the driving support ECU 21 executes the control of the EDSS when the operation of the EDSS switch 31 is detected. However, the present disclosure is not limited to such a configuration. For example, the configuration may be such that the support device 11 is not provided with the EDSS switch 31 and the driving support ECU 21 constantly executes the EDSS control.

What is claimed is:

1. A vehicle abnormality handling support device comprising:
 a presentation device configured to be able to present information; and
 a control device configured to determine whether a presentation condition is satisfied, in which the presentation condition includes that an abnormal condition indicating that an abnormality has occurred for a driver of a vehicle while the vehicle is traveling is satisfied, and to present on the presentation device, information on a handling method for the abnormality that is stored beforehand when the control device determines that the presentation condition is satisfied, wherein the presentation device is a display device that displays an image, and wherein the control device is configured to cause the display device to display a first image that is an image related to a handling method of the abnormality stored beforehand and that is associated with the abnormality, when the control device determines that the presentation condition is satisfied, and wherein from a time when the control device determines that the abnormal condition is satisfied while the vehicle is traveling until the vehicle is stopped, the control device is configured to cause the display device to display a second image that informs an occupant that the first image is displayed on the display device after the vehicle is stopped.

2. The vehicle abnormality handling support device according to claim 1, wherein the control device is configured to execute automatic stop control that automatically stops the vehicle when the control device determines that the abnormal condition is satisfied while the vehicle is traveling, and determines that the presentation condition is satisfied when the vehicle is stopped by the automatic stop control.

3. A vehicle abnormality handling support device comprising:
   a presentation device configured to be able to present information; and
   a control device configured to determine whether a presentation condition is satisfied, in which the presentation condition includes that an abnormal condition indicating that an abnormality has occurred for a driver of a vehicle while the vehicle is traveling is satisfied, and to present on the presentation device, information on a handling method for the abnormality that is stored beforehand when the control device determines that the presentation condition is satisfied wherein the presentation device is a display device that displays an image, and wherein the control device is configured to cause the display device to display a first image that is an image related to a handling method of the abnormality stored beforehand and that is associated with the abnormality, when the control device determines that the presentation condition is satisfied, and wherein a plurality of images including a video that indicates how to use an automatic extracorporeal defibrillator, a video showing a procedure of cardiopulmonary resuscitation, and an image indicating information regarding the driver is stored beforehand in the control device as an image regarding a handling method of the abnormality, and the control device is configured to cause the display device to display, as the first image, one or a plurality of images that is set beforehand to be displayed when the control device determines that the presentation condition is satisfied, among the plurality of images stored beforehand, when the control device determines that the presentation condition is satisfied.

4. The vehicle abnormality handling support device according to claim 3, wherein the control device is configured to execute automatic stop control that automatically stops the vehicle when the control device determines that the abnormal condition is satisfied while the vehicle is traveling, and determines that the presentation condition is satisfied when the vehicle is stopped by the automatic stop control.

* * * * *